Oct. 27, 1970     T. G. SMOLKA ET AL     3,535,953
ADJUSTABLE RELEASABLE SPRING LOCKING DEVICE
Filed Nov. 1, 1967     2 Sheets-Sheet 1
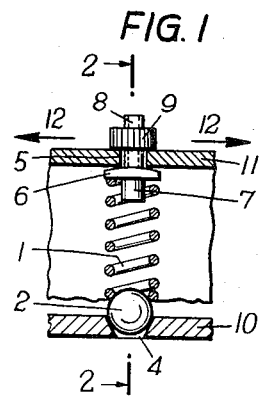
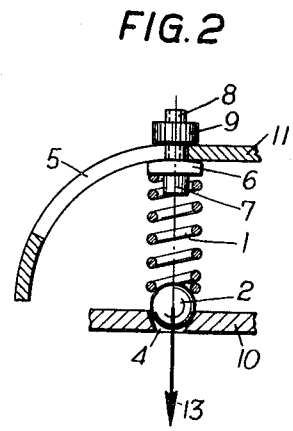
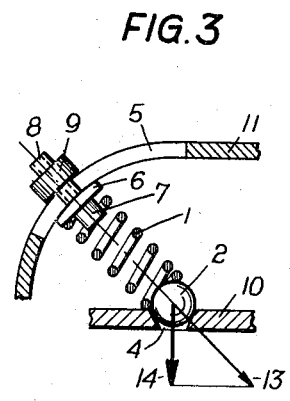
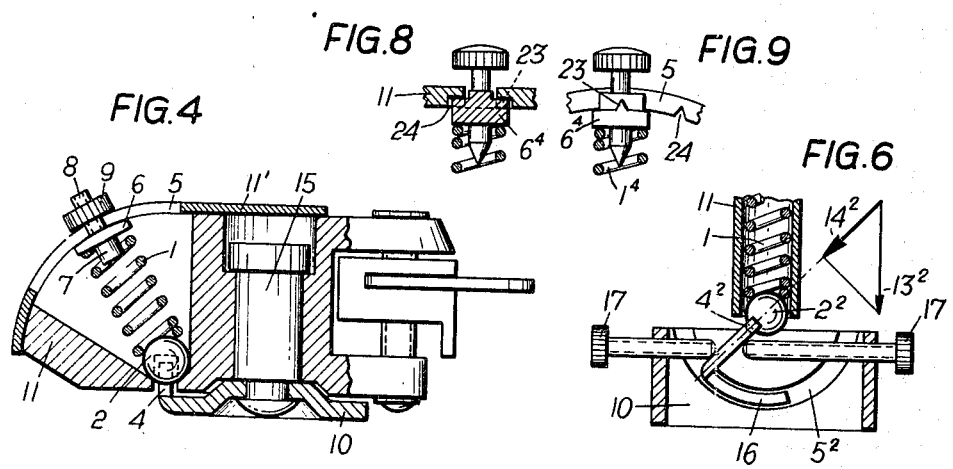
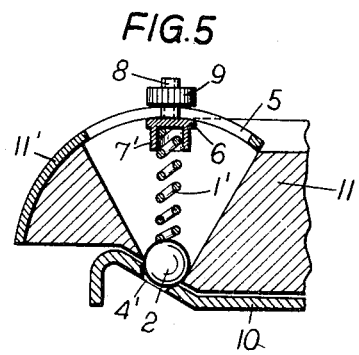
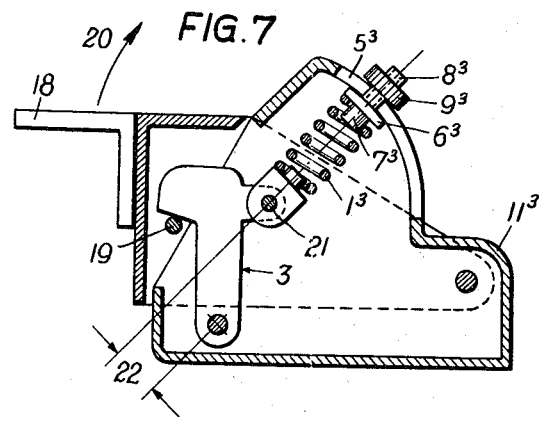

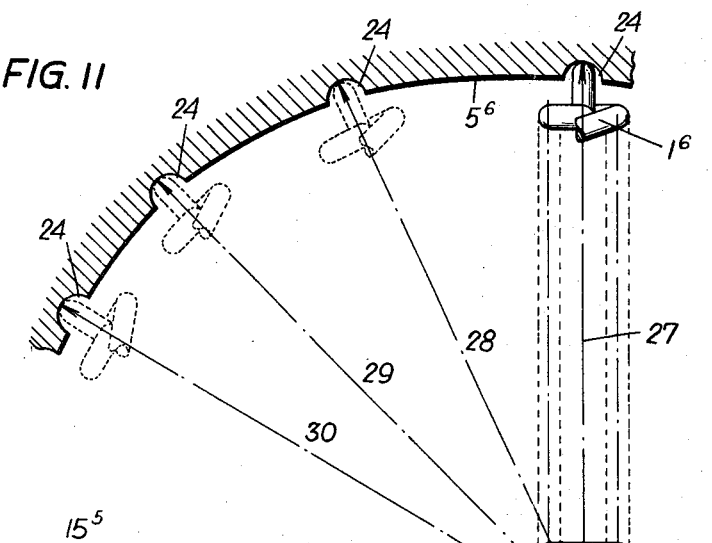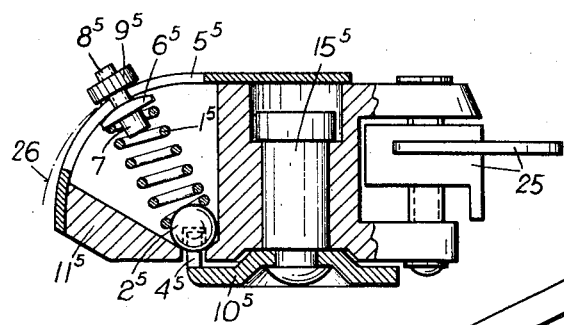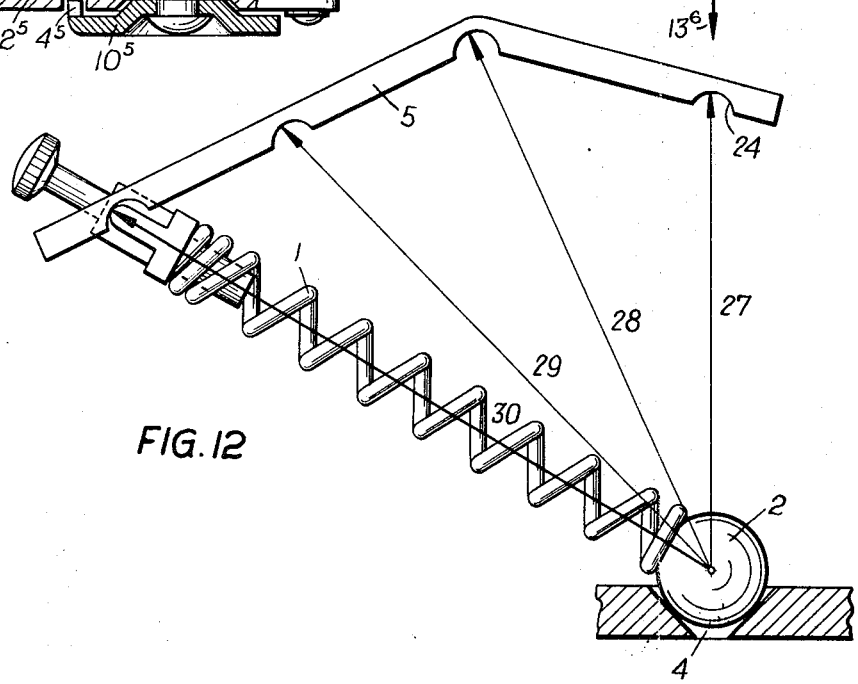

United States Patent Office 3,535,953
Patented Oct. 27, 1970

3,535,953
ADJUSTABLE RELEASABLE SPRING
LOCKING DEVICE
Thomas G. Smolka, Vienna-Mauer, and Johann Zelinka, Vienna, Austria, assignors to Wiener Metallwarenfabrik Smolka & Co., Vienna-Mauer, Austria, a corporation of Austria
Filed Nov. 1, 1967, Ser. No. 679,860
Claims priority, application Austria, Nov. 2, 1966, A 10,170/66; Jan. 19, 1967, A 562/67
Int. Cl. G05g 5/02
U.S. Cl. 74—527
12 Claims

ABSTRACT OF THE DISCLOSURE

A spring locking device, particularly for safety ski bindings, which comprises a first structure member including a locking cup receiving a ball and a second structure member including a curved path. A bolt has an abutment means and a threaded projection and extends through the curved path of the second structure member. Means are provided for securing the bolt in a plurality of different positions in the path. A spring is disposed between the ball and the abutment means. Means for setting the line of influence of the spring force occurring on the locking point in different positions, are provided and further means for securing the spring in respective positions.

---

The present invention relates to a spring locking device, in general, and to such spring locking device for safety ski bindings, in particular, wherein the releasing force of the locking device of one or a plurality of springs is adjustably provided.

It is one object of the present invention to provide a spring locking device wherein the line of influence of the spring force occuring at the point of locking (ball, locking cup) is adjustable into different positions and is securable in such positions. If namely the line of influence has different positions and different inclinations, respectively, at the locking point, corresponding different values result for the actual releasing force. This function is more clearly developed below in connection with concrete examples.

With this and other objects in view, which will become apparent in the following detailed description, the present invention will be clearly understood in connection with the accompanying drawings, in which:

FIG. 1 is a section of a locking device, designed in accordance with the present invention;

FIG. 2 is a section along the lines 2—2 of FIG.1;

FIG. 3 is a section, similar to that of FIG. 2, of the locking device, however, the spring being shown in a different position;

FIGS. 4 and 5 are sections of the spring locking device disclosed in FIGS. 1 and 3 incorporated in pivoting members;

FIG. 6 is a fragmentary section of a portion of the locking device;

FIG. 7 is a section of another application of the spring locking device of the present invention;

FIG. 8 is a section of a device indicated as stepwise adjusting means of the locking device;

FIG. 9 is an elevation of the device disclosed in FIG. 8;

FIG. 10 is a section of a front releasable locking member according to the present invention; and FIGS. 11 and 12 are elevations, partly in section, of two different embodiments of the subject matter of the present invention.

Referring now to the drawings and in particular to FIGS. 1 and 3, one structural part 10 is equipped with a locking cup 4 into which a locking ball 2 enters under pressure of a spring 1.

The spring 1 is disposed on bolt 7 which has at its end an abutment on which the spring 1 supports itself. The abutment has a threaded projection 8 which projects through a slot 5 of a second structural member 11 and is fixable thereto by means of a nut 9. The second structural part 11 is curved within the range of the slot 5, whereby the slot 5 forms a circular guide path, the center or radius of curvature of which is disposed adjacent the engaging point of the spring 1 on the locking ball 2, at the center of the locking ball 2.

If the two members 10 and 11 are to be displaced relative to each other in the direction of the arrows 12 (FIG. 1), the magnitude of the vector force 13 (FIG. 2) exerted by the spring 1 on the locking ball 2 must be overcome. If the spring 1 swings into a different position, for instance, as shown in FIG. 3, the same magnitude of the force 13 affects still the locking ball 2, yet for a release of the locking device only the vertical component of the vector force 13, namely the force 14 is to be overcome, which is appreciably smaller. In the extreme case, that is if the spring would be swung over for 90°, the locking force would be equal to zero.

Referring now to FIG. 4, a front member 11 is swingably mounted about a bolt 15 and is retained in operative position by the locking device. The locking cup 4 is disposed on an upwardly directed stay of a base plate 10. The slot 5 is arranged in a cover sheet 11'. Upon releasing of the locking, that means, upon safety opening of the member 11, only the vertical component of the force, provided by the spring 1, is to be overcome. In the vertical position of the spring 1 the strongest locking is brought about, since in this position the full spring force becomes effective (see also FIG. 2).

FIG. 5 is an arrangement similar to that of FIG. 4. Here merely the locking cup 4' is disposed at a different angle to the base plate 10 and the swinging range of the spring 1' is displaced likewise about this angle. The function is the same as with the structure disclosed in FIG. 4. The bolt 7' is sleeve-like in form, in the bore of which the spring 1' is arranged.

Referring now to FIG. 6, the locking cup $4^2$ is swingably arranged relative to the locking ball $2^2$. For this purpose a circular-shaped path $5^2$ is provided, the center of which is defined by the center of the ball $2^2$ and in which path $5^2$ is displaceable the locking cup $4^2$ with a projection 16 properly bent to correspond with the curvature of the path $5^2$. Two screw bolts 17 serve the fixing of the locking part $4^2$ and 16 in the desired position. Depending upon the position of the locking part $4^2$ and 16, the component force $14^2$ of the spring force $13^2$ defined by the locking cup $4^2$ is to be overcome upon releasing of the locking.

Referring now to the embodiment disclosed in FIG. 7, a holder 18, swingably disposed on the housing $11^3$, is retained at a pin 19 by means of a locking lever 3 in its operative position. The spring 13 is pivotally secured to the locking lever 3 at the pivot point 21. In case of an overload, for instance, in case of a fall of the user of the device, the holder 18 is swung upwardly due to a release force acting in this direction in the direction of the arrow 20 and pushes the locking lever 3 rearwardly against the force of the spring $1^3$ by means of the pin 19.

The center point of the slot $5^3$ provided in the housing $11^3$ is disposed in the rotary center point 21 of the spring $1^3$ on the locking lever 3. Depending upon the position of the spring $1^3$, the distance of the line of influence of the spring force from the swinging point 22 of the locking lever 3 varies and thus the releasing force of the binding changes. In this embodiment the swinging point 22 of the locking lever 3 could alternately be arranged also displaceably in a circular path, the center of which is likewise the pivot point 21 of the spring $1^3$ on the locking lever 3 and under circumstances, the spring can then be arranged immovably.

The adjustment of the spring $1^3$ can be continuous, as shown, or stepwise. In the latter case engagement means can be provided for one of the parts $6^3$, $7^3$, $8^3$ or $9^3$ (or other moveable parts in the event of alternate arrangements described above) into which it penetrates then in the predetermined positions.

Such possibility of formation is apparent from FIGS. 8 and 9. An abutment $6^4$ is formed with a detent 23, which alternately engages recesses 24. After pressing down the abutment $6^4$ against the force of the spring $1^4$, the detent 23 can be brought out of engagement and the spring 1 can be swung into the desired position.

Referring now to FIG. 10 of the drawings, a front swinging cheek $11^5$ is disposed which is swingably mounted about the bolt $15^5$. In the operative position the swinging cheek $11^5$ is retained by locking between the ball $2^5$ and the locking cup $4^5$. The ball $2^5$ is loaded by means of the spring $1^5$. As apparent, the locking cup $4^5$ is formed on an upwardly directed stay of the base plate $10^5$. The spring 1 supports itself by means of its end, which is remote from the ball $2^5$ at an abutment $6^5$ which has a threaded projection $8^5$.

The abutment $6^5$, which is displaceable in the path $5^5$ can be clamped in each desired position. By the locking between the parts $2^5$ and $4^5$ at this locking position, the cheek $11^5$ is retained in normal operation in this position. If an overload occurs, for instance, in case of a fall of the user, the cheek $11^5$ swings about the bolt $15^5$ and the locking between the elements $2^5$ and $4^5$ is released against the force of the spring $1^5$ and the ski boot (not shown) becomes free. The ski boot is retained by a member 25 projecting from the device.

As can be ascertained from FIG. 10, the abutment $6^5$ is displaceable along a path, which deviates from a circular path about the center point of the ball $2^5$. The circular path 26 is shown in point-dotted lines. The locking force between the ball $2^5$ and the cup $4^5$ is given by the pretension of the spring $1^5$ and the direction of the spring force. The effect of the setting of the locking force in the construction according to FIG. 10 will be explained below, after basic explanations are set forth in connection with FIG. 11.

Referring now again to the drawing and in particular to FIG. 11, the path $5^6$ is only partly a circular path. Due to a plurality of recesses 24 provided in the path $5^6$, the spring $1^6$ can assume different positions 27, 28, 29 and 30. In the position 27, as disclosed in FIG. 11, the force of the spring $1^6$ is arranged perpendicular to the axis of the locking cup 4, as is indicated by the force $13^6$. The locking force $13^6$ is thereby the largest locking force, since in the position 27 the spring $1^6$ has the greatest pretension. This greater pretension becomes fully effective in view of the lockings between the ball $2^6$ and the cup $4^6$. If the spring $1^6$ assumes the position 28, the pretension is reduced, since the corresponding recess 24 is further away from the center point of the ball $2^6$, than in the position 27. One has now basically a smaller locking force 31 at disposal. Additionally only the vertical component of the smaller locking force 31, thus the locking force 14 becomes effective. By the swinging of the spring $1^6$ from the position 27 into the position 28 thus the locking force became smaller in accordance with the given two paths. A corresponding double reduction of the locking force occurs, if the spring $1^6$ is swung from the position 28 into the position 29, since then the recess 24 is again still further away from the ball $2^6$. If one swings the spring $1^6$ from the position 29 into the position 30, the effective component of the locking force becomes again correspondingly smaller. However, on this last swinging path the pretension has remained equal, since the two last recesses, are equally spaced apart from the center point of the ball $2^6$.

After these explanations, the operation of the adjustment of the spring 1 in the construction according to FIG. 10 becomes easily understood. Upon swinging of the spring $1^6$ from the vertical position into the position indicated in FIG. 10, the pretension of the spring $1^6$ has not been changed, since the first part of the path $5^6$ is circularly shaped. However, in the already described manner the effective component of the locking force has become smaller. If the spring $1^6$ swings now further to the left, the pretension increases, since the slidepath $5^6$ approaches the ball $2^6$. As before, in case of a more oblique position of the spring $1^6$, the effective component of the locking force becomes smaller. This reduction of the locking force is compensated to a desired percentage by the greater pretension available now, since in this structure a very fine regulation can take place.

Referring now to FIG. 12, by the position 27 the greatest locking force is provided, in accordance with the statements made above (greatest pretension, locking force completely effective). The positions 28, 29 and 30 provide in succession smaller locking forces, whereby, however, the pretension in the effected component becomes smaller. In this structure the change of the locking force between the positions 27 and 28, as well as between the positions 29 and 30, is comparatively large.

The present invention is not limited to the shown examples. Many construction possibilities are within the scope of the present invention. It is essential thereby that the engaging point of the spring serves always as the swinging point on a locking part.

It is to be understood that the locking cup 4 can also be displaced relative to the spring loaded ball, whereby the swinging can take place along a correspondingly chosen, curved path, as indicated above. Depending upon the operating conditions, the curved path can always be arranged as required and can also be determined by empirical means. In addition to the swinging movements increasing and reducing the pretension, also such pretentions can be provided which remain constant. Upon swinging in one direction, as already disclosed above, the pretension and the effective component of the locking force can become smaller and vice versa. By the construction according to the present invention means are available to adjust the controlling locking force to provide a safety release at any desirable release force or operating conditions. The structure according to the present invention is of course useable also for heel holder and also to all similar binding parts equipped with ball catches.

Herein the spring biased means includes the spring, the ball, and/or the pivot 21. The guided means includes, for example, the bolt and/or abutment thereon, or the socket member $4^2$ with projectoin $1b$.

While we have disclosed several embodiments of the present invention, it is to be understood that these embodiments are given by example only and not in a limiting sense.

We claim:

1. A releasable spring locking device, particularly for safety ski bindings, comprising
   two members,
   at least one of said two members moveably disposed relative to the other of said members,
   spring biased means operatively connecting said two members and providing a directionally adjustable vector force, including a component thereof for effectively holding said two members in a fixed position relative to each other,
   a guide path means in one of said two members, and means guided by said guide path means into a plurality of positions along the latter and operatively connected to said spring biased means for changing the direction of said vector force and the magnitude of said component of said vector force for holding said two members in said fixed position relative to each other.

2. A releasable spring locking device, particularly for safety ski bindings, comprising
two members,
at least one of said two members moveably disposed relative to the other of said members,
spring biased means operatively connecting said two members and adapted for providing a vector force, including a component thereof for effectively holding said two members in a fixed position relative to each other,
a guide path means in one of said two members,
means guided by said guide path means into a plurality of positions along the latter and operatively connected to said spring biased means for changing the magnitude of said component of said vector force for holding said two members in said fixed position relative to each other, and
said spring biased means includes a pretensioned spring and is swingable about a point adjacent the other of said two members.

3. A releasable spring locking device, particularly for safety ski bindings, comprising
two members,
at least one of said two members moveably disposed relative to the other of said members,
spring biased means operatively connecting said two members and adapted for providing a vector force, including a component thereof for effectively holding said two members in a fixed position relative to each other,
a guide path means in one of said two members,
means guided by said guide path means into a plurality of positions along the latter and operatively connected to said spring biased means for changing the magnitude of said component of said vector force for holding said two members in said fixed position relative to each other,
said spring biased means includes a pretensioned spring and a ball operatively connected thereto,
a locking cup in the other of said two members in which said ball is releasably held by said spring for holding said two members in said fixed position relative to each other, and
said spring is swingable about the center of said ball in said locking cup by said guided means.

4. A releasable spring locking device, particularly for safety ski bindings, comprising
two members,
at least one of said two members moveably disposed relative to the other of said members,
spring biased means operatively connecting said two members and adapted for providing a vector force, including a component thereof for effectively holding said two members in a fixed position relative to each other,
a guide path means in one of said two members,
means guided by said guide path means into a plurality of positions along the latter and operatively connected to said spring biased means for changing the magnitude of said component of said vector force for holding said two members in said fixed position relative to each other,
said guide path means is circularly curved,
said spring biased means is swingable about a point adjacent the other of said two members,
means for fixing said guided means in a plurality of positions along said guide path means, and
the radius of curvature of said guide path means is substantially located at said point.

5. A releasable spring locking device, particularly for safety ski bindings, comprising
two members,
at least one of said two members moveably disposed relative to the other of said members,
spring biased means operatively connecting said two members and adapted for providing a vector force, including a component thereof for effectively holding said two members in a fixed position relative to each other,
a guide path means in one of said two members,
means guided by said guide path means into a plurality of positions along the latter and operatively connected to said spring biased means for changing the magnitude of said component of said vector force for holding said two members in said fixed position relative to each other,
said guided means includes a moveable socket member having a locking cup,
said spring biased means includes a spring and a ball connected thereto, the latter being releasably held by said spring in said locking cup releasably holding said two members in said fixed position relative to each other, and
means for securing said moveable socket member in a plurality of positions along said guide path means.

6. The spring locking device, as set forth in claim 5, wherein
said spring supports itself at one end of said other of said two members and at the other end on said ball,
said guide path means forms a circular slot means,
said socket member includes a circular arc part moveably mounted in said circular slot means and a radial part having a free end at the radius of said circular arc part, said free end constituting said locking cup,
said securing means includes opposed two screw bolts having abutment ends, respectively, positioned against and from opposite sides on said radial part,
said bolts each have a threaded projection extending through said one of said two members for adjusting the positions of said abutment ends thereof.

7. A releasable spring locking device, particularly for safety ski bindings, comprising
two members,
at least one of said two members moveably disposed relative to the other of said members.
spring biased means operatively connecting said two members and adapted for providing a vector force, including a component thereof for effectively holding said two members in a fixed position relative to each other.
a guide path means in one of said two members,
means guided by said guide path means into a plurality of positions along the latter and operatively connected to said spring biased means for changing the magnitude of said component of said vector force for holding said two members in said fixed position relative to each other,
said one of said two members has a plurality of recesses along said guide path means and spaced apart from each other, and
said guided means includes a detent selectively received in said recesses and constituting a securing means for said guided means.

8. A releasable spring locking device, particularly for safety ski bindings, comprising
two members,
at least one of said two members moveably disposed relative to the other of said members.
spring biased means operatively connecting said two members and adapted for providing a vector force, including a component thereof for effectively holding said two members in a fixed position relative to each other,
a guide path means in one of said two members,
means guided by said guide path means into a plurality of positions along the latter and operatively connected to said spring biased means for changing the magnitude of said component of said vector force for holding said two members in said fixed position relative to each other, said guide path means includes a slot in said one of said two members, two guided means includes an abutment member abutting said spring biased means at one end of the latter and adjacent said one of said two members and said slot, and includes a bolt having a threaded projection passing through said slot, and a nut disposed on said threaded projection constituting a means for securing said abutment member in said plurality of positions along said guide path means.

9. A releasable spring locking device, particularly for safety ski bindings, comprising two members, at least one of said two members moveably disposed relative to the other of said members, spring biased means operatively connecting said two members and adapted for providing a vector force, including a component thereof for effectively holding said two members in a fixed position relative to each other, a guide path means in one of said two members, means guided by said guide path means into a plurality of positions along the latter and operatively connected to said spring biased means for changing the magnitude of said component of said vector force for holding said two members in said fixed position relative to each other, and said guide path means is at least partly circular and deviates at least partly from a circular curve.

10. The spring locking device, as set forth in claim 9, wherein said spring biased means includes a pretension spring, and is swingable about a point adjacent the other of said two members, and the pretension of said spring varies upon displacing said guided means along said guide path means in one direction due to a varying compression of said spring.

11. A releasable spring locking device, particularly for safety ski bindings, comprising two members, at least one of said two members moveably disposed relative to the other of said members, spring biased means operatively connecting said two members and adapted for providing a vector force, including a component thereof for effectively holding said two members in a fixed position relative to each other, a guide path means in one of said two members, means guided by said guide path means into a plurality of positions along the latter and operatively connected to said spring biased means for changing the magnitude of said component and said vector force for holding said two members in said fixed position relative to each other, a pivot point connected to one end of said spring biased means, a lever means pivotally mounted to said one of said two members and pivotally connected to said pivot point and abutting the other of said two members, for holding said two members in said fixed position relative to each other, 12. The spring locking device, as set forth in claim 10, wherein said spring guide path means is closest to said point said spring has its strongest pretension at a position therealong when said spring is oriented so that said vector force equals in magnitude and direction said component thereof for effectively holding said two members in a fixed position relative to each other.

References Cited

UNITED STATES PATENTS

| | | | |
|---|---|---|---|
| 3,172,677 | 3/1965 | Marker. | |
| 147,561 | 2/1874 | Judd | 24—252 |
| 1,794,224 | 2/1931 | Buchanan. | |
| 1,928,245 | 9/1933 | Bloss et al. | 74—591 |
| 1,937,740 | 12/1933 | Woolson. | |
| 2,421,567 | 6/1947 | Krause | 74—522 X |
| 2,461,034 | 2/1949 | Castle | 74—522 X |
| 2,620,672 | 12/1952 | McMahon | 74—10.41 |
| 2,797,593 | 7/1957 | Braskamp | 74—600 X |
| 2,817,989 | 12/1957 | Nowak. | |
| 2,926,405 | 3/1960 | Moesch | 24—252 X |
| 2,934,973 | 5/1960 | Smith | 74—600 |
| 3,005,614 | 10/1961 | Daniell | 248—284 X |
| 3,200,614 | 8/1965 | Udry | 24—252 X |
| 3,396,679 | 8/1968 | Primak. | |
| 895,334 | 4/1944 | Tronchet | 24—201 |

WESLEY S. RATLIFF, Jr., Primary Examiner